United States Patent [19]
Dankberg et al.

[11] Patent Number: 6,011,952
[45] Date of Patent: *Jan. 4, 2000

[54] SELF-INTERFERENCE CANCELLATION FOR RELAYED COMMUNICATION NETWORKS

[75] Inventors: Mark D. Dankberg, Encinitas; Mark J. Miller, Vista, both of Calif.; Michael G. Mulligan, Westford, Mass.

[73] Assignee: Viasat, Inc., Carlsbad, Calif.

[*] Notice: This patent is subject to a terminal disclaimer.

[21] Appl. No.: 09/009,573

[22] Filed: Jan. 20, 1998

[51] Int. Cl.$^7$ ...................................................... H04B 1/56
[52] U.S. Cl. .......................... 455/24; 455/278.1; 455/296
[58] Field of Search ................................... 455/24, 62, 63, 455/67.1, 67.3, 295, 296, 303, 304, 307, 278.1; 375/211, 214.3

[56] References Cited

U.S. PATENT DOCUMENTS

| | | |
|---|---|---|
| 3,419,682 | 12/1968 | Thompson et al. |
| 3,750,179 | 7/1973 | Tewksbury ............................ 343/175 |
| 3,993,867 | 11/1976 | Blood, Jr. ............................. 178/58 |
| 4,086,534 | 4/1978 | Olsen .................................... 325/15 |
| 4,140,972 | 2/1979 | Enriquez et al. ..................... 325/58 |
| 4,146,838 | 3/1979 | Takada ................................. 325/3 |
| 4,178,550 | 12/1979 | Acampora et al. .................. 325/41 |
| 4,320,498 | 3/1982 | Justice ................................. 370/27 |
| 4,385,378 | 5/1983 | Kreutel, Jr. ......................... 370/19 |
| 4,393,494 | 7/1983 | Belforte et al. ..................... 370/27 |
| 4,470,138 | 9/1984 | Gutleber .............................. 370/18 |
| 4,516,236 | 5/1985 | Hadziomerovic .................. 370/24 |
| 4,535,445 | 8/1985 | Lane et al. .......................... 370/62 |
| 4,593,399 | 6/1986 | Baugh et al. ....................... 375/104 |
| 4,701,935 | 10/1987 | Namiki ................................ 375/4 |
| 4,712,235 | 12/1987 | Jones, Jr. ............................ 379/410 |
| 4,896,371 | 1/1990 | Kahn .................................... 455/105 |
| 4,952,193 | 8/1990 | Talwar ................................. 455/63 |
| 4,995,104 | 2/1991 | Gitlin .................................. 370/6 |
| 5,131,032 | 7/1992 | Esaki et al. ........................ 379/410 |
| 5,193,112 | 3/1993 | Sano ................................... 379/410 |
| 5,307,405 | 4/1994 | Sih ...................................... 379/410 |
| 5,315,585 | 5/1994 | Iizuka et al. ....................... 370/32.1 |
| 5,436,887 | 7/1995 | Eisenhuth .......................... 370/24 |
| 5,444,864 | 8/1995 | Smith ................................. 455/24 |
| 5,450,456 | 9/1995 | Mueller .............................. 375/224 |
| 5,475,731 | 12/1995 | Rasmusson ........................ 379/3 |
| 5,596,439 | 1/1997 | Dankberg et al. ................. 359/161 |
| 5,691,978 | 11/1997 | Kenworthy ........................ 370/278 |

Primary Examiner—Thanh Cong Le
Attorney, Agent, or Firm—Townsend and Townsend and Crew LLP; Kenneth R. Allen

[57] ABSTRACT

A communication network consisting of two types of links. A first link is one in which a source-transmitted signal is cancelled at the receiver associated with the transmitter, so that the desired received signals can be extracted from a composite received signal, the composite received signal consisting of the source-transmitted signal relayed from the relay station along with the desired received signals from one or more other users, plus additive noise. The other link is one in which no cancellation is performed on the received composite signal.

10 Claims, 3 Drawing Sheets

SELF-INTERFERENCE CANCELLATION FOR RELAYED COMMUNICATION NETWORKS

CROSS REFERENCE TO RELATED PATENT

This invention is an extension of U.S. Pat. No. 5,596,439 issued Jan. 21, 1997 based on U.S. patent application Ser. No. 08/520,868 filed Aug. 1, 1995 entitled SELF-INTERFERENCE CANCELLATION FOR TWO-PARTY RELAYED COMMUNICATION which is incorporated herein by reference. The prior patent, published less than one year prior to the filing date of the present application, is in the names of the same inventors as the present application and is therefore not prior art to the present application under 35 U.S.C. §102.

BACKGROUND OF THE INVENTION

The present invention relates to a radio frequency or optical communication system in which a relay station is used to aid communication among a network of parties, and more particularly to an improvement allowing more efficient use of the available channel resource.

Radio frequency or optical communication among a network of physically separate devices using a third party relay station is illustrated in FIG. 1. The relay station 10 receives a signal $S_1, S_2, S_3, \ldots$, and/or $S_N$ from each of the user devices 12, 14, 16, ..., 18 and retransmits the composite received signal $S_1+S_2+S_3+ \ldots +S_N$ back to all of the user devices 12, 14, 16, ..., 18, typically on a frequency channel offset from the receiving frequency channel. Two examples are:

1. Satellite communication among a network of earth terminals (ground, airborne, or shipboard) using a non-processing "bent pipe" transponder.
2. Terrestrial line-of-sight radio communication among a network of terminals, using a relay radio to connect them (such as in a tethered aircraft or a radio tower).

The relay resource is typically shared using any of the well-known multiple access techniques such as Frequency Division Multiple Access (FDMA), Time Division Multiple Access (TDMA), Code Division Multiple Access (CDMA) or hybrids which use one or more of these techniques in combination. In each of these techniques, the relay resource is effectively channelized, so that the receiver can, by tuning in on a specific frequency, at a specific time, with a specific code, or some combination thereof, isolate a particular received signal from all the others. For simplicity, the following discussion will be based on the FDMA technique, although the apparatus may be used with TDMA, CDMA, or hybrid transmission and reception techniques.

Often one (or more) of the user devices or network stations is more capable than the others, being able both to transmit wider bandwidth signals at a higher power and to receive and process lower power signals from multiple sources simultaneously. In such networks, the more capable station 12 is often termed the "hub" while the less capable stations 14, 16, ..., 18 are termed "spokes". The communication channels in such a network consist of one wide bandwidth channel for the transmissions from the hub 12 to all the spokes 14, 16, ..., 18 and multiple smaller bandwidth channels for the transmissions from each of the spokes 14, 16, 18, ..., 18 to the hub 12.

FIG. 2 shows a set of N signals associated with a hub and spoke network separated in the frequency domain. In this example, User 1 is the hub 12, and Users 2 to N are the spokes 14, 16, ..., 18. The signal $S_1$ transmitted by User 1 has a center frequency of $f_1$ Hz and a bandwidth of $W_1$ Hz; the signal $S_2$ transmitted by User 2 has a center frequency of $f_2$ Hz and a bandwidth of $W_2$ Hz; and so on for all N users in the network. With the FDMA approach, the total bandwidth required to support simultaneous transmissions from all of users in the network is the sum of the individual bandwidths $(W_1+W_2+ \ldots +W_N)$ Hz, as all of the signals being relayed are assigned to non-overlapping bandwidths. The bandwidth of the relay therefore imposes a limit on the number of users. Although this is a straightforward partitioning of the relay resource among a number of users, it is not necessarily the most efficient use.

What is needed is a mechanism to provide more efficient use of the available channel resource to support relayed communication among a network of radio frequency or optical terminals of differing capabilities. More specifically, what is needed is an improvement which is independent of the multiple access technique in use, independent of the modulation and coding of the system and which is independent of any data compression techniques or need for special equipment at the relay station.

SUMMARY OF THE INVENTION

According to the invention, a communication network is provided which consists of two types of links, a link in which a source-transmitted signal is cancelled at the receiver associated with the transmitter, so that the desired received signals can be extracted from a composite received signal, with the composite received signal consisting of the source-transmitted signal relayed from the relay station along with the desired received signals from one or more other users, plus additive noise; and the other in which no cancellation is performed on the received composite signal.

The invention takes advantage of the fact that the more capable user knows a priori the exact structure of its source transmitted signal and can estimate the channel characteristics between the relay station and itself, and the fact that the signals transmitted by the less capable users are significantly lower in power than the signal transmitted by the more capable user.

A device, such as the one disclosed in the applicant's U.S. Pat. No. 5,596,439, located at the more capable station uses this knowledge to help estimate:

The round-trip propagation delay to and from the relay station; and

Relative signal amplitude, carrier frequency and phase (if applicable to the selected modulation waveform) of the relayed source signal vs. the a priori known source signal.

Once the device at the more capable sending station has determined these parameters it can subtract a time-adjusted, frequency-adjusted, phase-adjusted and amplitude-adjusted version of the known a priori transmitted signal from the composite relayed (downlink) signal from the relay station. The remaining signal consists of the desired signals from the other users, plus additive noise due to the communication channel, plus an error signal resulting from residual misalignment of time, phase, frequency, and amplitude.

The invention will become better understood upon review of the drawings and accompanying technical description.

DESCRIPTION OF SPECIFIC EMBODIMENTS

Figure 3:
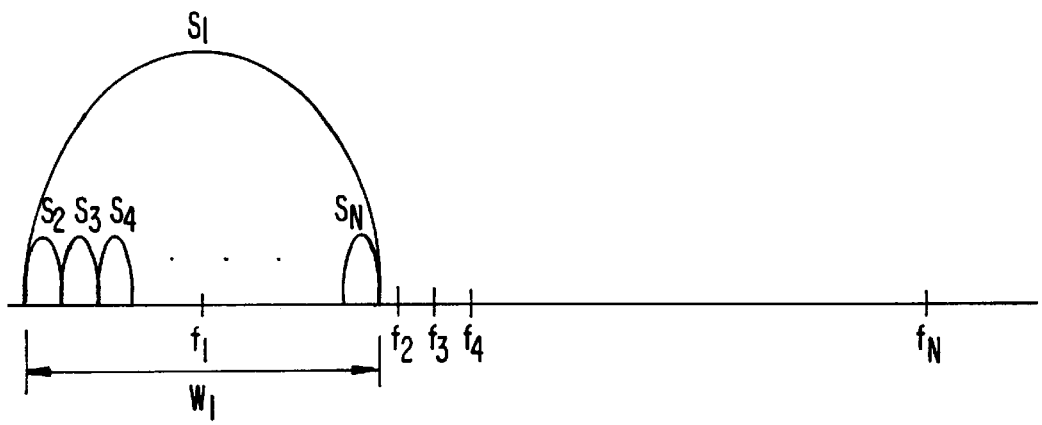
FIG. 3 is a diagram illustrating the required bandwidth for networked communication with the present invention.

FIG. 3 is a diagram illustrating the required bandwidth for network communication according to the present invention. Signals $S_2, S_3, S_4, \ldots$, and/or $S_N$ are transmitted within the same spectral region as broader band $S_1$ of the more capable user device, the particular benefit of the invention thus being the increased utilization of available bandwidth by overlapping of the outbound user signals. Using the invention, a number of the less capable user devices can transmit signals to the more capable user device while the more capable user device simultaneously transmits its (composite) signal to the less capable user devices within the same bandwidth. The resulting total bandwidth occupied by the group of signals is thus less than that required by conventional frequency division multiplexed schemes, thus freeing bandwidth for other uses. According to the invention the more capable device originating a signal has knowledge of its own source signal and is able to estimate the channel characteristics so that it can interpret received signals within its reception spectrum. Moreover, the asymmetric nature of the signals (typically with the power and spectrum of the more capable device being much larger than any of the other signals) means that no cancellation of the source signals of the less capable devices is needed at those less capable devices in order to interpret the downlinked composite signal initiated by the more more capable device.

The invention also applies to systems in which the relay resource is channelized using TDMA, CDMA, or hybrid multiple access techniques, and not only the FDMA technique used for illustrative purposes in which the relay resource is partitioned by means of frequency channelization. In each case, the signal transmitted by the more capable user device is assigned a larger portion of the channel resource which would then also be assigned in overlapping fashion to the signals transmitted by multiple less capable user devices to the more capable user device.

A system according to the invention requires merely a self-interference cancellation device at only the more capable user device, and not at every user device in the network.

Figure 4:
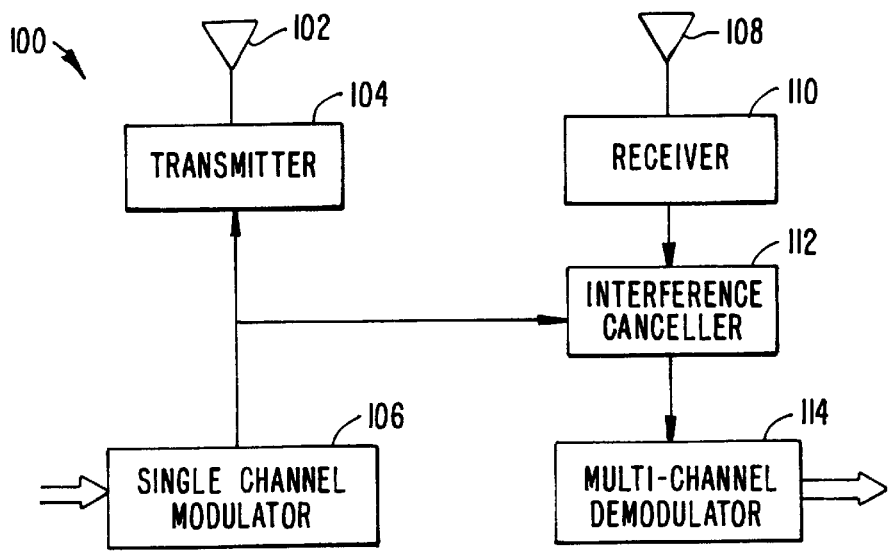
FIG. 4 is a block diagram of an embodiment of the invention used at the more capable network stations.

The invention may be implemented via hardware, firmware or software, and more particularly in digital signal processing hardware, firmware or software. It may also be implemented largely in analog (linear) hardware. Recognizing that the invention can serve as an enhancement to existing communication equipment as illustrated by FIG. 4, the choice of implementation for the invention will depend on the particular application. Each device 100 has a transmitting antenna 102 or equivalent signal radiator, a transmitter 104, a single channel modulator 106, a receiving antenna 108, a receiver 110, an interference canceler 112 and a multi-channel demodulator 114. The transmitting antenna 102 directs a source signal $S_1$ to the relay station. The single channel modulator 106 originates the source signal. Through the receiving antenna 108, the receiver 110 receives the composite signal $S_1'+S_2+S_3+\ldots+S_N$, (including the relayed source signal $S_1'$). According to the invention, the interference canceler 112 compares a signal representing the composite signal $S_1'+S_2+S_3+\ldots+S_N$ and subtracts out a signal representing relayed source signal $S_1'$ based on a best guess of the characteristics of $S_1'$ and prior knowledge of the signal representing $S_1$, to obtain a signal representing $S_2+S_3+\ldots+S_N$. (For illustrative purposes here, there is assumed to be little or no difference between $S_1$ and $S_1'$, except that which can be easily accounted for.) The multi-channel demodulator 114 recovers the desired information from the signals representing each of the recovered signals $S_2, S_3, \ldots, S_N$.

Figure 1:
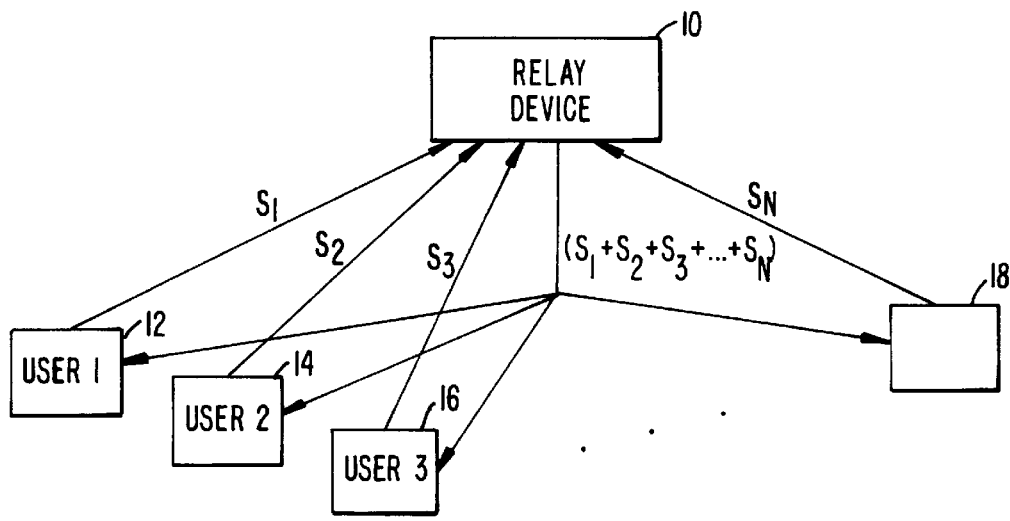
FIG. 1 is a diagram illustrating the configuration and operation of a relayed communication network.
Figure 2:
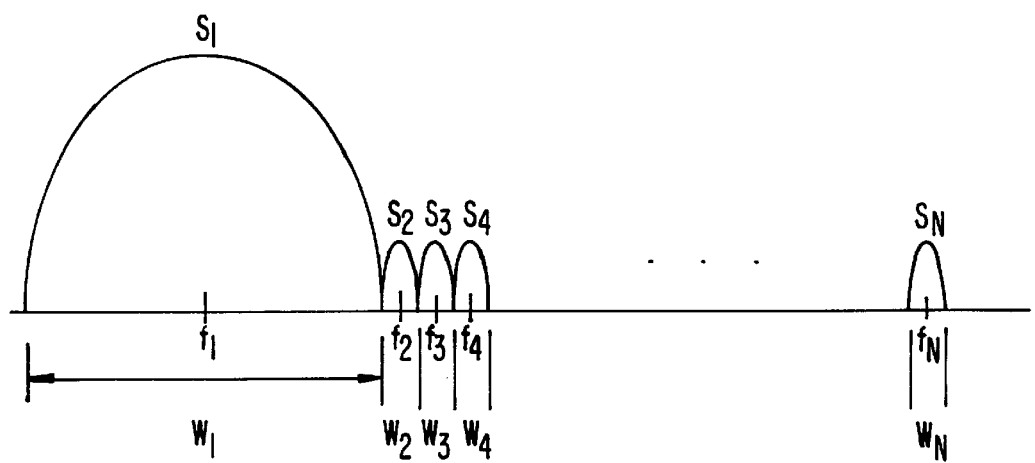
FIG. 2 is a diagram illustrating the required bandwidth for one form of networked communication.
Figure 5:
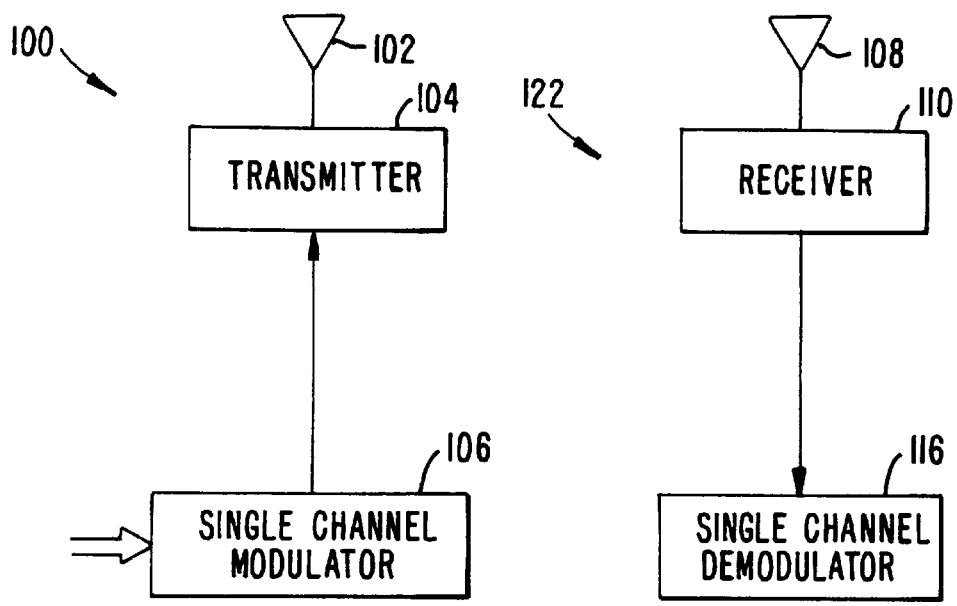
FIG. 5 is a block diagram of an embodiment of the invention used at the less capable network stations.

This device need only be used only at the more capable user device 12 (FIG. 1). The less capable user devices 14, 16, . . . , 18 may use standard subsystems 120, 122 for sending and receiving signals, as shown in FIG. 5. Specifically, the standard subsystem 120 includes a single channel modulator 106, a transmitter 104 and an antenna 102. The standard subsystem 122 includes an antenna 108, a receiver 110 and a mere single channel demodulator 116. No provision is made for conveying the output of the single channel modulator 106 into any stage of the receiving subsystem 122. While various transmission schemes may be used, suppressed carrier transmission, such as single sideband or double sideband suppressed carrier transmission, are suitable transmission schemes. The more capable device may transmit a pilot tone or signal on one frequency, such as $f_2$ (FIG. 3), to assist in signal recovery. Suppressed carrier transmission schemes benefit from synchronization with a pilot signal, whether or not the pilot signal is of the suppressed carrier type. In a time division (TDMA) system, each of the devices may be limited to transmit during a preassigned time slot. Spread spectrum techniques can also be used in accordance with the invention, resulting in processing gain.

By way of summary, the invention comprises a technique for relayed electromagnetic communication networking, for example radio or optical, among a number of devices through a relay station, such as a satellite transponder or a terrestrial repeater, comprising the steps of generating at a more capable device a source signal segment, storing a representation of the source signal segment, in for example a delay device, estimating channel characteristics of a roundtrip path to the relay station from the device to obtain compensation parameters, transmitting the source signal segment to the relay station where all signals are relayed, receiving at each device a composite signal segment from the relay station, where the composite signal segment contains a copy of the representation of the source signal from each transmitting device in the network, modifying the stored representation using the compensation parameters to obtain a cancellation signal, and subtracting the cancellation signal from the composite signal segment to recover the desired signals, the desired signals being the source signal segments from the other devices.

The method may be used with transmission on a first common transmit frequency channel and reception on a second common receive frequency channel to optimize bandwidth utilization. The method may also be used in time division multiple access systems or code division multiple access systems, sharing time slots and spreading codes, respectively.

The invention has now been explained with reference to specific embodiments. Other embodiments will be apparent to those of ordinary skill in the art. It is therefore not intended that the invention be limited except as indicated by the appended claims.

What is claimed is:

1. A method for relayed electromagnetic communication networking among a plurality of signalling devices through a relay station comprising the steps of:

generating at each said signalling device a source signal segment;

storing said source signal segment as a stored segment at a first one of said signalling devices, said first one including signal estimating and signal cancelling facilities;

estimating channel characteristics of a roundtrip path to said relay station to obtain compensation parameters for said first one of said signalling devices;

transmitting said source signal segment from each one of said signalling devices to said relay station;

receiving at each one of said signalling devices a composite signal segment from said relay station, said composite signal segment containing a representation of said source signal from each said device;

modifying said stored segment at said first one of said signalling devices using said compensation parameters to obtain a cancellation signal for said first one of said signalling devices; and subtracting at said first one of said signalling devices said cancellation signal from said composite signal segment to recover desired signals, said desired signals being representations of source signal segments from the other devices.

2. The method according to claim 1 wherein each said signalling device transmits on a first common uplink frequency channel and receives on a second common downlink frequency channel, transmission being of a suppressed carrier type transmission.

3. The method according to claim 2 wherein said first one of said devices transmits a first pilot signal on a first frequency.

4. The method according to claim 1 wherein each said signalling device transmits in a first common uplink time slot and receives in a second common downlink time slot, transmission being of a suppressed carrier type transmission.

5. The method according to claim 1 wherein each said device transmits a spread spectrum signal employing a common spreading code.

6. A system for relayed electromagnetic communication networking among a plurality of signalling devices through a relay station comprising:

means at each said signalling device for generating a source signal segment;

means at each said signalling device for transmitting said source signal segment to said relay station;

means at each said signalling device for receiving said source signal segment from said relay station;

means for storing said source signal segment as a stored segment at a first one of said signalling devices;

means at said first one of said signalling devices for estimating channel characteristics of a roundtrip path to said relay station to obtain compensation parameters for said first one of said signalling devices;

means at said first one of said signalling devices for receiving a composite signal segment from said relay station, said composite signal segment containing a representation of said source signal from each one of said signalling devices;

means at said first one of said signalling devices for modifying said stored segment using said compensation parameters in order to obtain a cancellation signal for said first one of said signalling devices; and means at said first one of said signalling devices for subtracting said cancellation signal from said composite signal segment to recover desired signals, said desired signals being representations of source signal segments from the other devices.

7. The system according to claim 6 wherein each said signalling device transmits on a first common uplink frequency channel and receives on a second common downlink frequency channel, transmission being of a suppressed carrier type transmission.

8. The system according to claim 7 wherein said first one of said devices transmits a first pilot signal on a first frequency.

9. The system according to claim 6 wherein each said signalling device transmits in a first common uplink time slot and receives in a second common downlink time slot, transmission being of a suppressed carrier type transmission.

10. The system according to claim 6 wherein each said device transmits a spread spectrum signal employing a common spreading code.

* * * * *